INVENTOR
Richard C. Leake,
BY Neil D. Preston
ATTORNEY

Patented Jan. 16, 1923.

1,442,685

UNITED STATES PATENT OFFICE.

RICHARD C. LEAKE, OF ROCHESTER, NEW YORK, ASSIGNOR TO GENERAL RAILWAY SIGNAL COMPANY, OF ROCHESTER, NEW YORK, A CORPORATION OF NEW YORK.

POINT DETECTOR.

Application filed March 18, 1919. Serial No. 283,369.

*To all whom it may concern:*

Be it known that I, RICHARD C. LEAKE, a citizen of the United States, and a resident of the city of Rochester, in the county of Monroe and State of New York, have invented a new and useful Point Detector, of which the following is a specification.

This invention relates to circuit controlling devices, sometimes termed point detectors, which are used in interlocking systems for railroads, for the purpose of safeguarding the movement of trains over switches.

In interlocking systems it is essential that the switch points of the various switches should be in the proper positions and securely locked before it is safe for either train to pass; and consequently, it is common practice to make suitable provision such that the signals governing traffic over a particular switch are so controlled as to signal a train to stop if the switch points are displaced in any way from their proper position or are not properly locked. This invention relates to a circuit controlling device, adapted to govern directly or indirectly the controlling circuits of signals, which will detect the positions of the switch points and their locked condition. This circuit controller, or point detector, is associated with the switch and lock movement, or switch machine, employed for moving and locking the switch points, and is also directly connected to the switch points, so that the operation of the point detector is dependent upon the position of the switch points and the locking and unlocking operation of the switch machine.

The primary object of my invention is to devise a point detector of the character mentioned which will be simple, reliable, and efficient, comprise few and rugged parts, and constitute a compact construction applicable to various working conditions.

Other objects of my invention will appear hereinafter as the characteristic features of construction, functions, and mode of operation of my point detector are described in detail.

In describing the invention, reference will be made to the accompanying drawings, in which like reference characters designate corresponding parts in the several views, and in which:

Fig. 12 is another view similar to Fig.

10 and shows the arrangement of notches and rollers preferably employed in detecting the four switch points of a double slip switch separately in pair;

Fig. 13 is a fragmentary side view showing the construction of the adjustment upon the pair of detecting bars illustrated in Fig. 12;

Fig. 14 is an end view of the switch machine detached and shows how the connections may be made between four separate switch points and four separate detecting bars;

Figure 1:
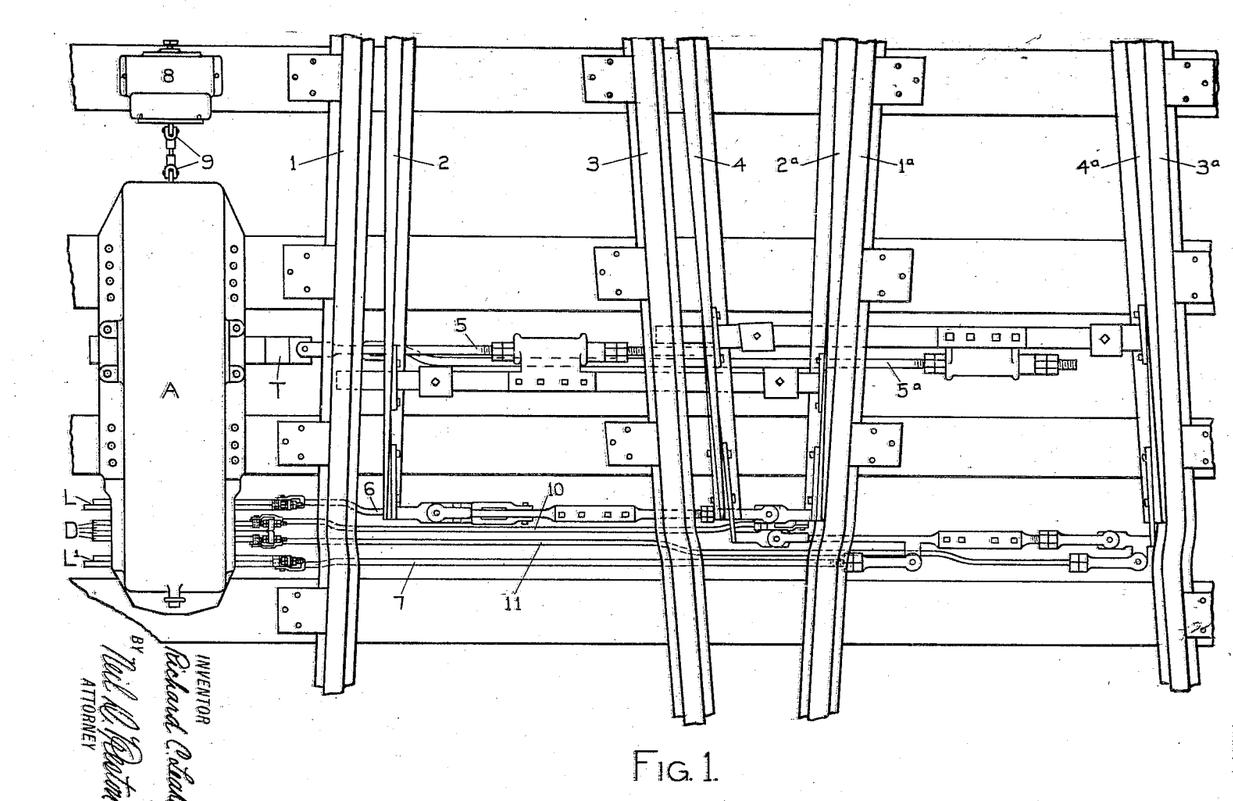
Figure 1 is a fragmentary view of a typical layout for a double slip switch, showing a switch machine, together with a point detector embodying my invention, connected to the switch points.

Referring to the accompanying drawings, Fig. 1 shows a typical layout for a double slip switch, comprising the stock rails 1—1$^a$ of one track and their associated movable switch points 2—2$^a$, and the stock rails 3—3$^a$ of the other track, with their movable switch points 4—4$^a$. This construction is well known and familiar to those skilled in the art and need not be described in detail. At one side of the double slip switch is shown the outline of a switch machine A. While the point detector embodying my invention may be applied to any suitable type of switch machine, I have illustrated its application to a switch machine of the type shown and described in the patent to W. K. Howe, No. 1,288,595, dated December 24, 1918. The throw rods 5 and 5$^a$ of the two pairs of switch points are connected together and then connected to the throw bar T of the switch machine. The front rod of the switch points 2—2$^a$ is connected by a rod 6 to one lock rod L of the switch machine; and the other lock rod L$^1$ is connected by a rod 7 to the front rod of the other pair of switch points 4—4$^a$. In the form of the switch machine illustrated, the operating motor 8 is enclosed in a separate casing at one end of the switch machine and is connected to the operating parts thereof by a shaft including universal couplings 9.

My point detector, as more fully explained hereinafter, comprises several detecting bars D extending transversely of the switch machine. In Fig. 1 four detecting bars D are shown, coupled together in pairs and relatively adjustable, as hereinafter explained, and one pair of detecting bars is connected by a rod 10 to one pair of switch points 2—2$^a$, the other pair of detecting bars being similarly connected by a rod 11 to the other pair of switch points 4—4$^a$.

Figure 2:
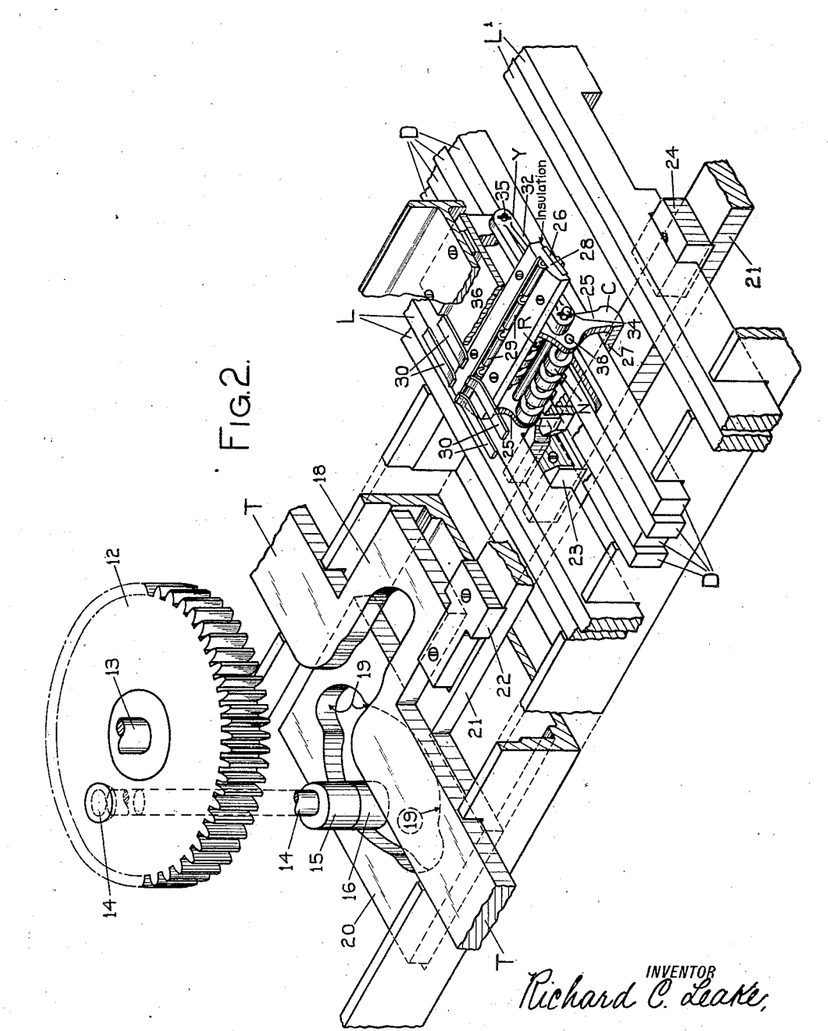
Fig. 2 is a perspective view, diagrammatic in its nature and having some parts broken away for clearness, which shows the mode of application of my point detector to a switch machine of well known construction.

In order to enable a clear understanding of the mode of operation of my point detector, there is illustrated in a diagrammatic way in Figure 2, the more significant and important operating parts of the switch machine A. In general, this switch machine comprises a main driving gear 12 (see Fig. 2), which is journaled upon a suitable fixed bearing stud 13, and which is connected by suitable gearing and a friction clutch (not shown) to the operating motor 8, as fully shown and described in the Howe patent above mentioned. To the main driving gear 12 is fastened a downwardly extending driving pin 14, on the lower end of which are journaled two rollers 15 and 16. The driving pin 14 is secured eccentrically to the driving gear 12, and as the driving gear is rotated by the motor, the rollers 15 and 16 travel in a circular path. The throw bar T is formed with an offset or side extension 18 having therein a laterally opening jaw, shaped to receive the upper driving roller 15. The lower driving roller 16 engages a cam slot 19, of general elliptical shape, formed in the enlarged head 20 of the locking bar or plunger 21, which extends longitudinally of the switch machine and has fastened thereto locking dogs 22, 23 and 24. The locking dog 22 is arranged to engage behind the side edges of the offset portion 18 of the throw bar T, thereby locking the throw bar in its normal and reverse positions. The lock dog 23 engages in notches in the lock rod L, thereby locking it in its normal and reverse positions. This lock dog 23 is specially constructed to cooperate with my point detector, as hereinafter explained, being formed with a longitudinal groove having flared ends. The lock dog 24 cooperates with notches in the lock rod L$^1$. When the switch machine is used with a single slip switch, only one lock rod L is, of course, necessary, the lock rod L$^1$ and the lock dog 24 being omitted. The lock rods L and L$^1$ are illustrated as formed of two separate rods having an adjustable connection (see Fig. 1), for permitting relative adjustment for the purpose described in the Howe patent above mentioned.

The operation of the switch machine is fully described in said Howe patent and for a clear understanding of the present invention, the operation need be only briefly outlined. The parts are shown in Fig. 2 in the normal position. When it is desired to reverse the switch, power is supplied to the operating motor 8, and this motor drives the main gear 12. (in a clockwise direction, as shown). The lower driving roller 16 cooperates with the cam slot 19 in the enlarged head 20 of the locking plunger 21 and causes said locking plunger to move to the right, as viewed in Fig. 2, thereby unlocking the throw bar T and the two lock rods L and L$^1$. The upper driving roller 15 enters the jaw in the offset portion 18 of the throw bar T, and as the roller 15 continues its clockwise movement in a circular path, the throw bar T is moved to the left, as viewed in Fig. 2, so as to move the switch points to the reverse position. The lower roller 16 then engages the other side of the cam slot 19 and causes the locking plunger 21 to move back to its locking position. At this point in the operation, the current to the motor is automatically cut off by a pole changer (not shown), as described in the above mentioned Howe patent, and the indication circuits are established, snubbing the motor and bringing its armature to rest gradually without shock.

Figure 3:
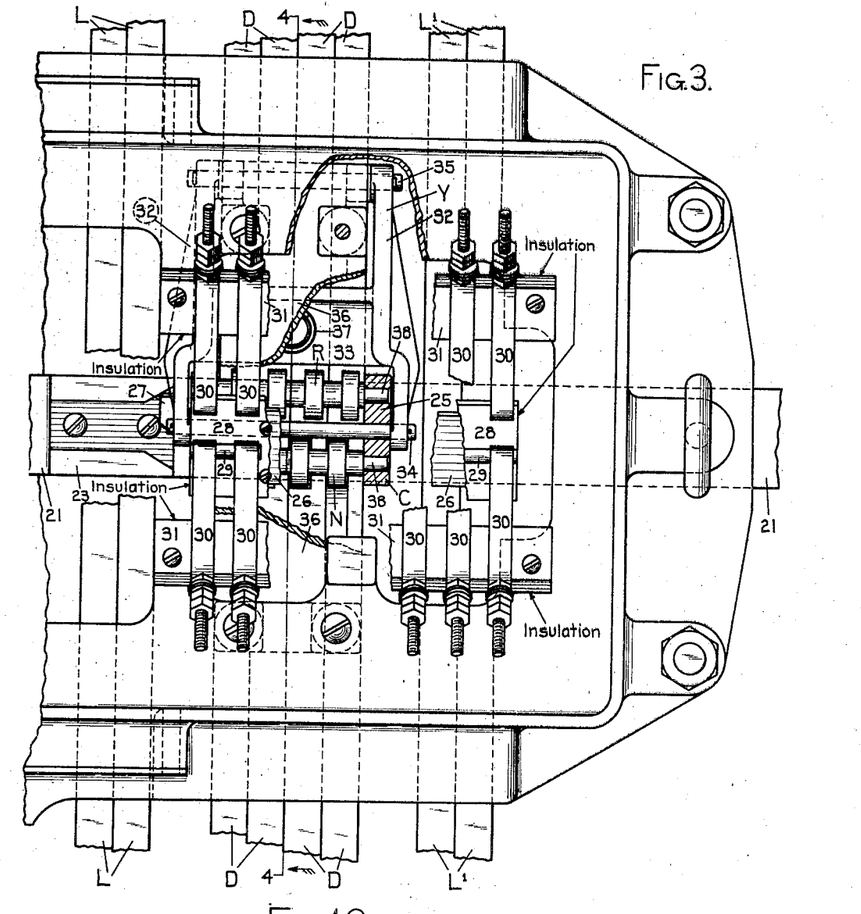
Fig. 3 is a plan view of my point detector and some of the associated parts of the switch machine, certain parts having been broken away for the sake of clearness.
Figure 4:
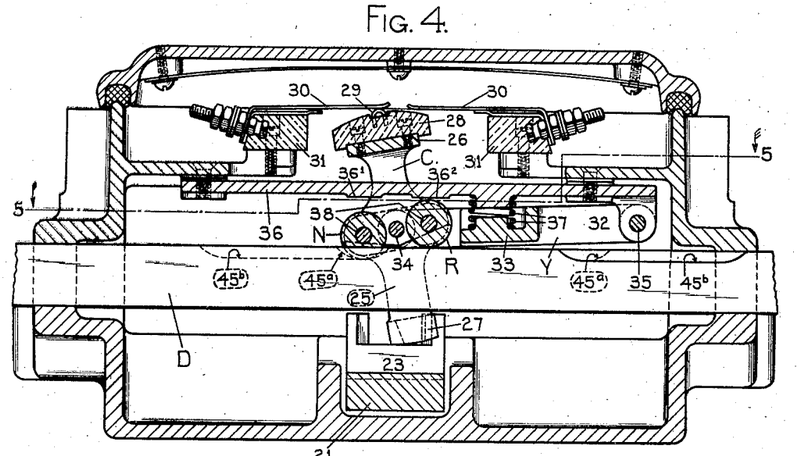
Fig. 4 is a vertical transverse section through the point detector and switch machine taken substantially on the line 4—4 in Fig. 3 and looking in the direction indicated by the arrows.
Figure 5:
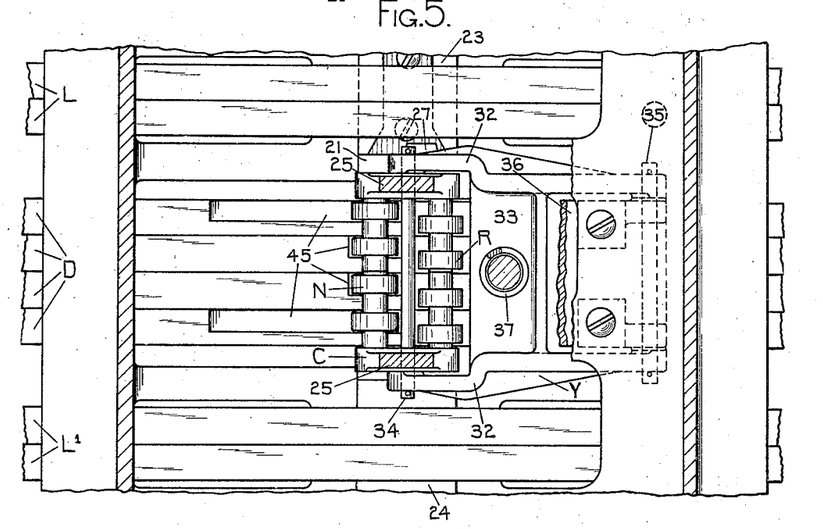
Fig. 5 is a horizontal section taken substantially on the line 5—5 in Fig. 4 looking downward in the direction indicated by the arrows.

The detail construction of my point detector is illustrated in Figs. 3 to 5. This construction, while susceptible of considerable modification without departing from my invention, is preferred in connection with the switch machine of the type described, because of the simple and compact character of the design. The primary purpose of the constructiton is to make the movement of a single circuit controlling element dependent upon the position of the various detecting bars D, and also the locked or unlocked position of the locking plunger 21 of the switch machine. This single circuit controlling element, conveniently termed a contact cradle C, comprises two side members or lugs 25 connected at the top by a flat bar 26, and at the bottom by an operating lug or foot 27, having one end beveled, (see Figs. 2 and 5), for the purpose hereinafter explained. To the top bar 26 is fastened a block 28 of insulating material, having embedded therein metallic contact pieces 29. A plurality of resilient contact fingers 30 are fastened at their ends to blocks 31 of insulating material which extend parallel with the top bar 26 and the axis of oscillation of the contact cradle C, said insulating blocks 31 being suitably fastened, as by screws, to the framework or casing of the device. When the contact cradle C is in one extreme position, as shown in Figure 4, its contact pieces 29 electrically connect the several pairs of contact springs 30 on that side, and when said cradle is swung to the other extreme position, the pairs of contact fingers 30 on the opposite side are electrically connected, suitable controlling circuits being in this way selectively made and broken by the movement of said contact cradle.

The contact cradle C is supported by a rocker yoke Y so as to be able to rock about a point near its middle on a horizontal axis, and also to move bodily up and down to a limited extent. The rocker yoke Y comprises two side arms 32 connected at their middle points by a transverse web 33. These side arms 32 carry at one end a horizontal pin 34, which passes through the side members 25 of the contact cradle C and constitutes its rocking support, said pin 34 being held in place by small transverse pins or the like. The side arms 32 of the yoke Y are pivotally supported at their opposite ends on a pin 35, which is supported in downwardly extending lugs integral with a horizontal top plate 36, said pin 35 being likewise held in place by small transverse pins or the like. Between the transverse web 33 of the yoke Y and the top plate 36, is a compression coil spring 37, said spring being held in position by appropriate bosses, as shown.

Figure 16:
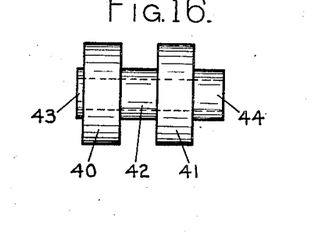
Fig. 16 is a fragmentary view of a roller unit forming part of my point director.

In the side members 25 of the contact cradle C are fastened two roller supporting shafts 38, these shafts 38 extending horizontally lengthwise of said contact cradle C and on opposite sides of its supporting pin 34. On the shafts 38 are loosely journaled two sets of rollers N and R. Each of these sets of rollers comprises two of the units shown in Figure 16 arranged end to end. Each of these units consists of two rollers 40 and 41 connected by an integral neck 42 of smaller diameter. One roller 40 is provided with a short integral hub 43, and the other roller 41 is provided with a long integral hub 44, the combined lengths of the hubs 43 and 44 being equivalent to that of the neck 42, for the reason hereinafter explained. The top plate 36 has two finished bosses $36^1$ and $36^2$ on its under face which are located above the sets of rollers N and R, for the reasons hereinafter explained.

The detecting bars D previously mentioned extend transversely of the switch machine and pass underneath the sets of rollers N and R and above the foot 27 of the contact cradle C, as best shown in Fig. 4. These detecting bars D are formed with narrow grooves or notches 45 in their upper faces, slightly wider than the rollers 40 and 41. The length and arrangement of the notches 45 in the detecting bars D is slightly different according to the use to which the point detector is put, as explained hereinafter.

Figure 6:
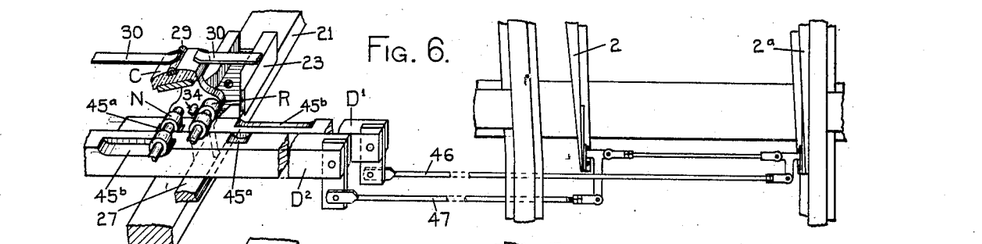
Figs. 6 to 9 inclusive are diagrammatic views showing my point detector in simplified form applied to a single slip switch, and illustrating the sequence of operation of the parts under different working conditions, Fig. 6 illustrating the switch points in the full reverse position, Fig. 7 illustrating the switch points partly moved abnormally to an intermediate position, Fig. 8 illustrating the switch points in the full normal position, and Fig. 9 illustrating the switch points in their full reverse position but unlocked.
Figure 7:
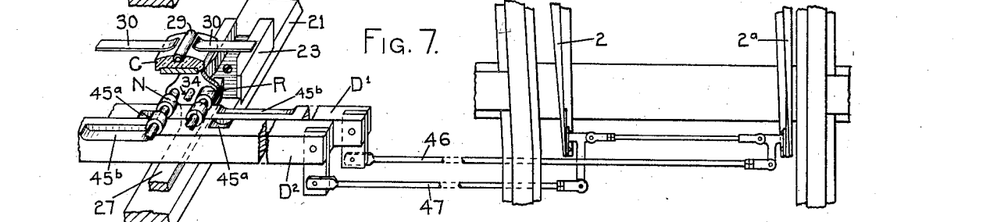
Figure 8:
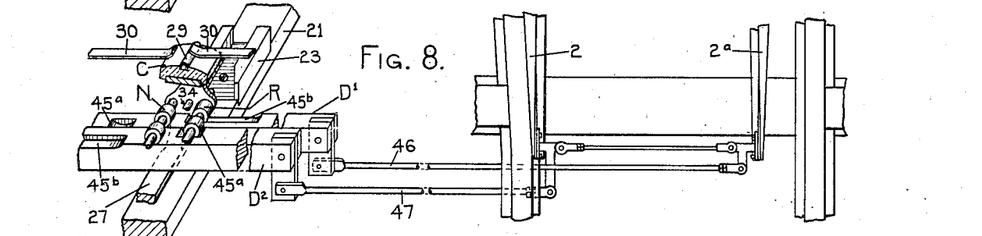

The operation and essential characteristics of my point detector can more readily be understood from consideration of its simplest application to a single slip switch, shown in Figs. 6 to 9. In this application, two detecting bars $D^1$ and $D^2$ are used, these bars being connected by rods 46 and 47, respectively, to the switch lugs of the two switch points 2 and $2^a$. The detecting bar $D^1$ is provided with a short notch $45^a$ arranged underneath one of the rollers of the normal set N, when the switch points are in the normal position, as shown in Fig. 6. This bar $D^1$ also has a longer notch $45^b$ arranged to pass underneath a roller in the reverse set R when the switch points are moved to the reverse position, as shown in Fig. 8. The detecting bar $D^2$ is similarly provided with a short notch 45ª and a long notch 45ᵇ arranged to receive rollers of the reverse and normal sets in the corresponding position of the switch point. It will be noted that a short notch 45ª in one detecting bar is opposite a long notch 45ᵇ in the other bar, this arrangement of short and long notches being provided for the purpose of adjustment, as hereinafter explained.

With the switch points in the normal position, as shown in Fig. 6, the two normal notches 45ª and 45ᵇ on the detecting bars D¹ and D² are underneath the normal rollers N; and with the locking plunger 21 in the locked position, as shown in Fig. 6, the contact cradle C is caused to move to the normal extreme position, as shown. This movement is due to the way in which the contact cradle C is supported and the action of the spring 37. To explain further, referring to Fig. 4, it will be noted that the spring 37 constantly tends to move the pin 34, and, likewise the contact cradle C as a whole, downwardly. When the normal rollers N are above notches, (as shown in Fig. 4), it will be evident that the contact cradle C will swing to the left, fulcruming about the point where the reverse rollers R bear upon the upper faces of the detecting bars D.

Figure 9:
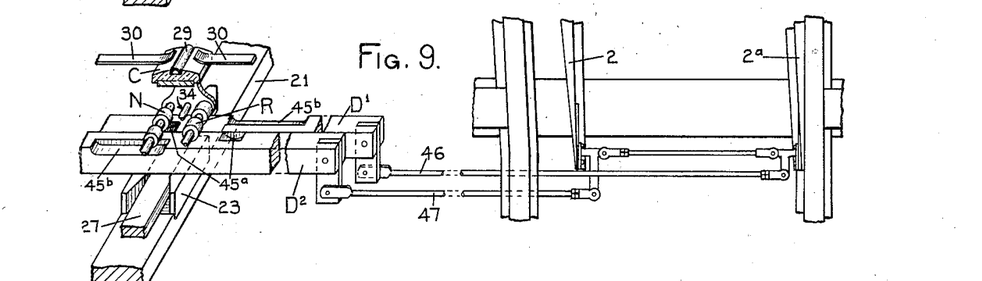

Upon the unlocking movement of the switch machine, the locking plunger 21 and the lock dog 23 carried thereby, move toward the foot 27 of the contact cradle C, and the beveled end of said foot cooperates with the flaring ends of the groove in said lock dog 23, so as to force said foot 27 to the middle position by a wedging or cam action. The resultant swinging and lifting movement of the contact cradle C places it in the middle position, as shown in Fig. 9, in which its contact pieces 29 do not touch any of the contact fingers 30. It will be evident that the contact cradle C will be maintained in this middle position so long as the switch remains unlocked.

After the switch points have been fully thrown to the reverse position, and the locking plunger 21 has made its locking movement, the parts assume the positions shown in Fig. 8. The movement of the switch points to the reverse position brings the reverse notches in the detecting bars D¹ and D² underneath the reverse set of rollers R, while the normal set of rollers N now bear upon the upper faces of said detecting bars. Consequently, due to the action of the spring 37, as previously explained, the contact cradle C is swung to the right to its reverse position, as shown in Fig. 8. Thus, it can be seen that the movements of the contact cradle C is dependent upon the locking plunger 21 and the position of the switch points. If the switch points are in the normal position and are locked up, the contact cradle C automatically assumes its normal extreme position. As soon as the switch points are unlocked, and so long as they remain unlocked, the contact cradle C is maintained in its middle position; and when the switch points are fully thrown to the reverse position and are locked up, contact cradle C automatically assumes its reverse position.

Any desired arrangement or combination of circuits may be controlled by the cooperation of the contact pieces 29 of the contact cradle C, and the contact springs 30. In some instances, the control circuits of the signal or signals, governing traffic over the switch in question, may be taken directly through said contacts; or, these contacts may be employed in a manner well known to those skilled in the art, for controlling a relay at the distant tower, sometimes termed an " SS Relay," which in turn governs the controlling circuit for the signal or signals. Since the particular type of circuits made and broken by the contact cradle C forms no part of my present invention, no attempt has been made to illustrate any of the well known circuit arrangements that may be used with my point detector.

In addition to detecting the position and locked condition of a pair of switch points, it is also desirable to detect an abnormal or improper movement of either one of this pair of switch points relatively to the stock rails. This desirable object is attained by my invention by reason of the fact, (referring to Fig. 6), that the detecting bars D¹ and D² are independently connected to the separate switch points 2 and 2ª of the single slip switch, so that if any abnormal movement of either one of the switch points without movement of the other, due to the breaking of some parts or any other cause, either one or the other of these detecting bars will be disturbed. For example, assuming the parts to be in the normal position, as shown in Fig. 6, if the detecting bar D¹ is moved to the left, as viewed in this figure, the roller in the short notch of this bar will be forced up, thereby fulcruming the contact cradle C about the axis of the reverse rollers R and shifting said cradle to its middle position. Consequently, the switch points 2ª which should be snug against its stock rail, cannot be appreciably moved from this position without shifting the contact cradle C of the point detector to its middle position, thereby interrupting the appropriate controlling circuits and detecting this abnormal condition. Likewise, if both the switch points, as a unit, should fail to assume their proper position, due to either an insufficient movement by the switch machine, or loose connections or the like permitting slight displacement of the switch points after they have been thrown and locked, the existing condition will be immediately detected by my point detector.

This condition is illustrated in Fig. 7, from which it will be observed that a slight displacement of both switch points from the normal position results in shifting the contact cradle C to the middle position, the normal notches on both of the detecting bars D¹ and D² forcing their corresponding rollers upward.

In view of the foregoing it will be evident that the simple application of my point detector, as illustrated in Figs. 6 to 9, absolutely assures that the switch points are in the proper position and are locked in that position, before circuits can be established at the contacts of the device. Further, any improper displacement of the switch points, together or separately, and more particularly the so-called closed point of the switch, will result in putting the contact cradle C to its middle position, thereby interrupting any circuits which may have been previously established. A considerable variation in the position of the open point of a switch may occur in practice without causing appreciable danger to train movement; whereas a very slight movement of the closed point of a switch may result in derailment or other accidents to a passing train. Consequently, the position of the open point of a switch need not be so carefully detected as the position of the closed point. In my point detector, the arrangement of notches and rollers is such that, when the switch point to which a detecting bar is connected becomes the closed point of the switch, the short notch of this detecting bar is under the corresponding set of rollers. Obviously, any slight displacement of this closed point from its correct position would be sufficient to force the corresponding roller out of the short notch. It will be evident, of course, that short notches in the detecting bars may be used for both the opened and closed position of a switch point; but I prefer to use the arrangement of short and long notches so as to provide the requisite adjustment to compensate for variations in the throw of the points of various switches, as hereinafter explained.

The throw of switch points varies somewhat with different switches and also with the same switch in time on account of wear. The arrangement of long and short notches in the detecting bars D and D¹, shown in Fig. 6, is provided so that these bars may be adjusted to compensate for variations in the throw of the switch points. In the construction shown in this figure, the adjustment is provided at the connections between the rods 46 and 47, and the switch lugs, although it is obvious that this adjustment may be provided at other places if desired. With the notches aligned opposite to each other, as shown in Fig. 6, the device is adjusted for the shortest throw; and for longer throws, the detecting bars D¹ and D² are slid by each other so as to increase the distance between the short notches, and this may be carried to the point where the short notch in the bar D², now shown as opposite the lefthand end of the long notch in the bar D¹, is aligned with the righthand end of said long notch. It should be observed that the long and short notches in each detecting bar D¹ or D² are cut along opposite edges of that bar; and since the rollers are as narrow as said notches, there is no possibility of the wrong roller dropping into the wrong notch. For example, the normal roller arranged to cooperate with the short notch 45ª in the bar D¹, (referring to Fig. 6), cannot under any circumstances drop into the long notch 45ᵇ in said bar, even through this long notch may pass under the normal set of rollers. Consequently, when the bars D¹ and D² are relatively adjusted for the maximum throw, it is impossible to cause an improper operation of the point detector.

In practice, the switch machine A may be placed on the righthand side of the switch, instead of on the lefthand side, as it is shown in Figs. 1 and 6; and in such case, the connections from the switch points to the detecting bars would have to extend from the opposite side of the switch machine. The notches in the detecting bars and the rollers are so arranged that the same parts can be used for lefthand operation as well as righthand operation, it being merely necessary to take out the detecting bars and put them into the switch machine from the other side, the same relative position of the bars being maintained. From an inspection of Fig. 6, it will be evident that such a reversal does not alter the relative position of the notches and the rollers. This provision is a valuable feature of my invention, since it makes the point detector applicable to practical working conditions without changing construction, or requiring the use of additional or substitute parts.

Figures 10, 11, 17:
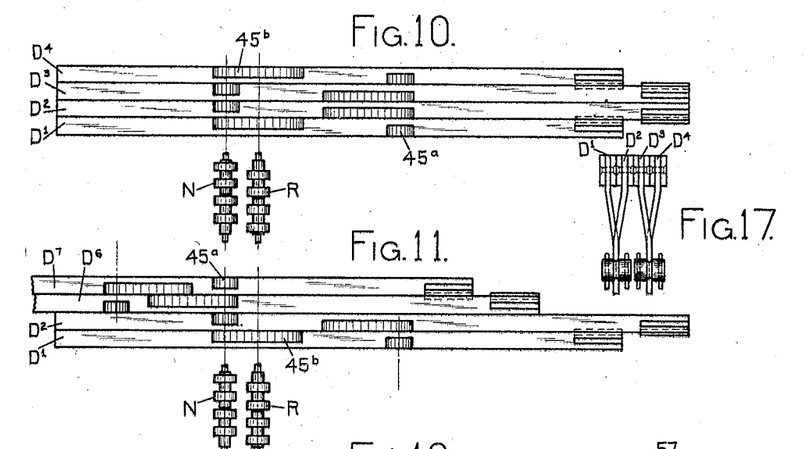
Fig. 10 is a plan view of a set of detecting bars of my point detector, and shows the preferred arrangement of notches and rollers employed for detecting the four switch points of a double slip switch separately and individually.
Fig. 11 is a view similar to Fig. 10 and shows the arrangement of notches and rollers employed for detecting the four points of a movable point frog separately and individually.
Fig. 17 is an end view of the bars shown in Fig. 10.

When the point detector is used in connection with a double slip switch, and it is desired to detect the four switch points separately in pairs, the same arrangement shown in Fig. 6 may be employed, the rod 46 being connected to one pair of switch points jointly, and the other rod 47 to the other pair of switch points. In some instances it may be desirable to detect separately each of the switch points of a double slip switch. This is readily accomplished with my point detector by using four detecting bars, one connected to each of the four switch points. The preferable arrangement of notches and rollers employed in such an application of the point detector, is illustrated in Fig. 10. It will be observed that this arrangement comprises a duplication of the arrangement shown in Fig. 6. The bars $D^1$ and $D^2$ have the same notches and are arranged in the same relative position in Fig. 10 as in Fig. 6, the only difference being that the bars in Fig. 10 are shown as adjusted for the maximum throw of the switch points, while those in Fig. 6 are adjusted for the minimum throw. The bars $D^3$ and $D^4$ in Fig. 10 have the same notching as the bars $D^1$ and $D^2$, but are arranged in a different order, the bar $D^4$, corresponding to the bar $D^1$ being the fourth bar, rather than the third bar. In applying this arrangement of detecting bars to a double slip switch the four detecting bars $D^1$, $D^2$, $D^3$ and $D^4$ are connected separately to the four switch points of the switch, by suitable adjustable connections, similar to those shown in Fig. 1. In each instance the particular switch point connected to each detecting bar is the one which will bring a short notch opposite one of the set of rollers when that switch point is closed, that is, is tight against the stock rail. For example, assuming the position of the detecting bars in Fig. 10 to be the normal position, the bars $D^2$ and $D^3$ would be connected to the two switch points of the double slip switch which are closed in the normal position of said switch.

My point detector can also be used with movable point frogs by applying the appropriate arrangement of notches in the detecting bars. In a movable point frog, as will be readily appreciated by those skilled in the art, the two pairs of points move in opposite directions when the frog is shifted from one position to the other, while the points of a double slip switch move in the same direction. Consequently, a different arrangement of notches is necessary. In Fig. 11 is illustrated an appropriate arrangement of notches for detecting separately the four points of a movable point frog. In this arrangement the bars $D^1$ and $D^2$ are the same as the bars $D^1$ and $D^2$ in Figs. 6 and 10. The bars $D^6$ and $D^7$, however, have a different arrangement of notches, the difference being that the long and short notches are closed together lengthwise of the detecting bar, the same relative arrangement of short and long notches on adjacent bars being retained. The other detecting bars $D^1$, $D^2$, $D^6$ and $D^7$ in this arrangement shown in Fig. 11 are connected to the points of the movable point frog in accordance with the same principle or rule, previously explained in connection with a double slip switch, so that a short notch is used for a closed point. Thus, the bars $D^2$ and $D^7$ are those connected to the two closed points when the movable point frog is in the position corresponding to the position of the detecting bars shown in Fig. 11. It will be apparent that the two bars $D^1$—$D^2$ and $D^6$—$D^7$, being connected to different pairs of the points of the movable point frog, will move in opposite directions relatively to each other as the frog is changed. As a result, the notches for one position of the frog, for example, the normal notches pass under the reverse set of rollers at each operation; but no improper operation of the point detector can occur, inasmuch as the notches and rollers are arranged, as previously explained, so that a roller of the normal set cannot drop into a reverse notch, and vice versa. In connection with the different arrangement of bars for use with a movable point frog, it should be noted that since the different pairs of bars move in opposite direction as the frog is changed, the two roller units of each of the sets N and R will be rotated in opposite directions. It will, therefore, be apparent that each set of rollers must comprise two of the units shown in Fig. 16, and each unit must be capable of moving independently.

In some cases it is not considered necessary to attempt to detect each of the four points of a double slip switch separately, it being considered sufficient to detect separately the two pairs of points as a unit. In such a case, only two detecting bars could be used, if desired, in the manner previously explained, the adjustment for variations in the throw of the points in this instance being accomplished by manipulating adjustable devices in the external connections between the detecting bars and the switch points.

Figures 12, 13, 14:
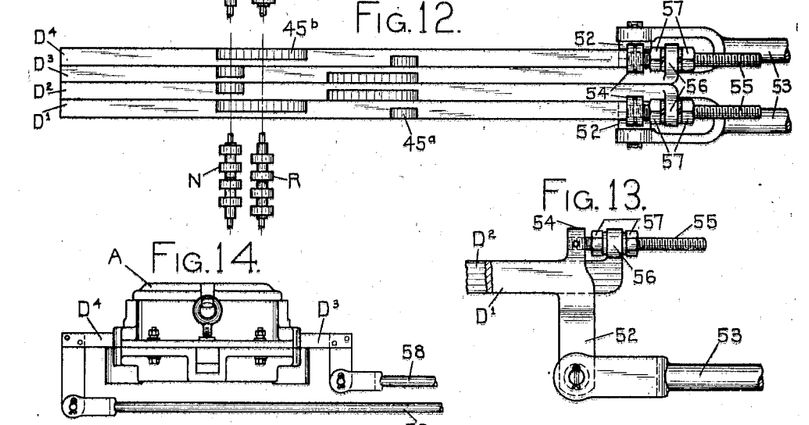

Since I contemplate in practical use that my point detector will be constructed to take four detecting bars, it is possible, and often desirable, to use all four bars and couple them together in pairs with a suitable adjusting device, even though it is contemplated to detect the four points of a double slip switch separately in pairs, or to detect separately the two points of a single slip switch. Such an arrangement is illustrated in Fig. 12. The notches in the bars are the same as in Fig. 10. Each of the two pairs of bars $D^1$—$D^2$, $D^3$—$D^4$ are coupled together by an adjusting device, as shown in Figs. 12 and 13. One bar $D^1$ is provided with an integral downwardly extending arm or lug 52, to which is connected a rod 53 extending to the switch point. The bar $D^1$ also has an upwardly extending lug 54, in which is fastened in any suitable way, as by a pin, one end of a screwthreaded rod 55. The rod 55 extends loosely through an upwardly extending lug 56 formed integral with the other detecting bar $D^2$; and on the rod 55 are adjusting and clamping nuts 57 bearing against the lug 56 on opposite sides thereof. The way in which this adjusting device is manipulated to move the two bars D¹ and D² relatively to each other, will be apparent without detail explanation. It will be observed that this adjusting device is of simple, rugged construction; permits positive adjustment to any small degree desired; and will hold the bars firmly in their adjusted positions. The bars D¹ and D² are shown in Fig. 12 in their relative position for maximum throw, but may be easily and quickly adjusted for shorter throws by manipulating nuts 57 to move D¹ and D² relatively to each other to bring the short notches closer together. This arrangement just described facilitates the application of the point detector to switches of different throws, and also enables the adjustment of the point detector to compensate for the variations in the throw of the same switch in service. This adjustment being at the switch machine and forming part of the point detector, permits the use of simple rods and connections between the detecting bars and the switch points.

The various arrangements shown in Figs. 10, 11 and 12 all possess the desirable feature of being applicable to either lefthand or righthand operation by merely withdrawing the bars from one side of the point detector and inserting them in the opposite side.

In instances where it is desired to use my point detector with a double slip switch, movable point frog, or the like, and it is further desired to detect separately four points, this involves making connections from each of the four detecting bars to a corresponding point; and under some circumstances, it is found difficult in practice to obtain the necessary clearance for making such connections to the four detecting bars on one side of the switch machine, such as contemplated in the arrangements of notches shown in Figs. 10 and 11. The arms fastened to the detecting bars may be offset vertically as shown in Fig. 17; but in some layouts, I find it preferable to employ connections on both sides of the switch machine as shown in Fig. 14.

Figure 15:
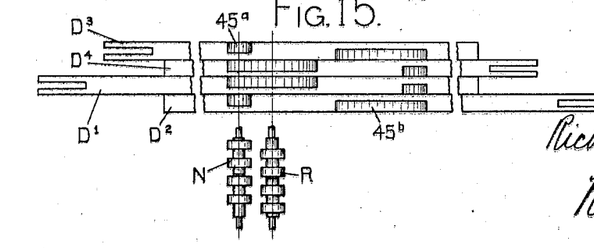
Fig. 15 is a plan view of a set of detecting bars and shows the arrangement of notches and rollers employed when the four detecting bars are separately connected to four switch points on opposite sides of the switch machine, as shown in Fig. 14.

In this arrangement, two of the detecting bars project from one side of the switch machine and are coupled to rods, such as 58, extending to the corresponding switch points, while the other two detecting bars project from the opposite side of the switch machine and are coupled to rods, such as 59, which extend under the switch machine to the corresponding switch points. The arrangement of notches employed with this construction are shown in Fig. 15; and it will be observed that the bars have the same notching as in Fig. 10 and are merely arranged in different order.

Regarding the advantageous features of construction and operation of the point detector embodying my invention, it will be noted that the construction is compact, yet consists of few parts which can be easily and cheaply manufactured. The notches in the detecting bars may be easily cut by ordinary machinery to make the point detector applicable to any desired layout of single or double slip switches, or movable point frogs, with detection of the various points either separately or in pairs. On account of the use of rollers and notches objectionable friction is eliminated, and there is little wear upon the parts in service. It should be observed that the movement of the contact cradle C to its middle or danger indicating position is obtained by the positive interaction of parts, and breakage or any failure of the parts tends to cause the contact cradle to assume its middle position. The spring 37, aside from being located and supported so as to be likely to function properly though broken, is not relied upon to cause a danger indication but merely serves to cause the contact cradle C to assume one or the other of its extreme positions. Referring to Fig. 4, it will be observed that the top plate 36 overlies the sets of rollers N and R in such a way that its bosses 36¹ and 36² limit the upward vertical movement of said rollers. This construction obviates the possibility of the contact cradle C being raised bodily about the axis of the pin 35, without being turned. Ordinarily the strength of the spring 37 is sufficient to prevent such bodily movement; but in case this spring should become weakened or broken, the contact cradle C will nevertheless be positively forced to its middle or danger position upon displacement of any one of its controlling detecting bars. For example, referring to Fig. 4, vertical movement of the normal set of rollers N results in positively forcing the contact cradle C to its middle position, even though the spring 37 is broken, since the boss 36² on the top plate 36 prevents upward movement of the set of rollers R, so that the contact cradle C must turn to its middle or danger position. Of course, if the spring 37 is broken, there is no tendency, other than the weight of the parts, to cause the contact cradle C to assume either one of its extreme positions, thus immediately manifesting that the device is out of order; but even if said contact cradle should have a tendency to move to one or the other extreme position, it could not do so unless the detecting bars were in the proper position and the switch machine was also locked. In short, any failure of the spring 37 is on the side of safety. The cooperation of the parts is such that the contact cradle C is positively forced to its middle position as soon as the unlocking movement of the switch machine commences; and furthermore, said contact cradle is positively held in this danger indicating position so long as the switch machine remains unlocked. The size of the rollers and the notches may be readily made, without undue refinement, such that a very slight displacement of the switch points from the proper position will result in positively forcing contact cradle C to its middle position. The arrangement of rollers and notching in the detecting bars is completely selective, as previously explained, so that it is impossible for the contact cradle C to be in either extreme position until each and all of the detecting bars are exactly in the corresponding position.

While I have illustrated and described various arrangements of bars and have explained how my point detector may be applied to various arrangements of switches and movable point frogs, it is obvious that various other adaptations could be employed and would be readily apparent to those skilled in the art. Also, while I have shown and described the preferred application of the various parts of my point detector, in the form which I have devised them particularly for use with a switch machine of one well known type, I desire to have it understood that this construction and arrangement of parts is susceptible of various changes and modifications, each embodying the functions and features of my invention; and consequently, I desire to have it understood that my invention is not limited to the particular construction shown and described.

What I claim as new and desire to secure by Letters Patent of the United States, is:—

1. In a point detector of the type in which a single circuit controlling element, movable from a middle position to either of two extreme positions, is governed by a number of detecting bars adapted to be connected to switch points, the combination with the movable circuit controlling element, of a spring normally acting upon said element and adapted to cause movement thereof to either selected extreme position, and means associated with the detecting bars for selectively determining the extreme position to which said element may be moved by said spring when the detecting bars are severally aligned in the corresponding position.

2. In a point detector of the type in which a single contact carrying element, movable from a middle position to either of two extreme positions, is governed by the locking plunger of a switch and lock movement and also by a number of detecting bars adapted to be connected to switch points, the combination with the contact carrying element, of means whereby said element is moved and held in its middle position while the locking plunger is unlocked but is permitted to assume either extreme position while said plunger is locked, means dependent upon a predetermined relation of the detecting bars for selectively governing the movement of said element to its extreme positions, and resilient means normally acting to cause said element to assume either extreme position as determined by said detecting bars.

3. In a point detector of the type in which a single circuit controlling element, movable from a middle position to either of two extreme positions, is governed by a number of detecting bars adapted to be connected to switch points, the combination with the circuit controlling element, of a movable support upon which said element is mounted to oscillate, a spring normally acting to move said support in one direction, and means associated with said element and with the respective detecting bars for permitting said element to assume either extreme position under the influence of said spring when the detecting bars are severally aligned in the corresponding position.

4. In a point detector of the type in which a single circuit controlling element, movable from a middle position to either of two extreme positions, is governed by a number of detecting bars adapted to be connected to switch points, the combination with the circuit controlling element, which is mounted to oscillate on a horizontal axis, of rollers carried by said element on opposite sides of its axis, a spring normally acting to cause movement of the axis of said element downward, and a number of slidable detecting bars arranged under said rollers and having notches therein adapted to receive said rollers.

5. In a point detector of the type in which a single circuit controlling element, movable from a middle position to either of two extreme positions, is governed by a number of detecting bars adapted to be connected to switch points, the combination with the circuit controlling element, of a movable support upon which said element is mounted to oscillate, rollers carried by said element on opposite sides of its axis of oscillation, a spring normally acting upon said support and tending to cause bodily movement of said element in one direction, and detecting bars having normal and reverse notches adapted to receive said rollers, said element being moved to one extreme position or the other by said spring when the notches in the several detecting bars are aligned underneath the rollers on one side of the axis of oscillation of said element.

6. In a point detector of the type in which a single circuit controlling element, movable from a middle position to either of two extreme positions, is governed by a number of detecting bars adapted to be connected to switch points, the combination with a number of sliding detecting bars arranged side by side and having notches in their upper edges, of a contact cradle mounted to oscillate on a horizontal axis extending transversely of the movement of said bars, rollers carried by said contact cradle on opposite sides of its axis and adapted to drop into aligned notches in said detecting bars, and a spring normally acting downward upon the axis of said contact cradle.

7. A point detector of the type described comprising a circuit controlling element mounted for oscillation on a horizontal axis and adapted to be moved from a middle position to either of two extreme positions, and means associated with said element and adapted to be actuated by the locking plunger of a switch and lock movement for exerting a force upon said element below its axis of oscillation and thereby forcing said element to its middle position while said locking plunger is unlocked.

8. A point detector of the character described comprising a rocking support, a spring acting to move said support in one direction, an oscillatable circuit controlling element carried by said support and having rollers disposed on opposite sides of its axis of oscillation.

9. A point detector of the character described comprising a contact cradle mounted to oscillate on a horizontal axis and carrying normal and reverse rollers on opposite sides of its axis of oscillation, and a number of detecting bars each having normal and reverse notches therein adapted to receive said rollers, said notches and rollers being capable of selective cooperation only.

10. A point detector of the character described comprising a pair of adjacent detecting bars each having a short and a long notch therein, the short and long notches of the adjacent bars being disposed opposite each other, and means for relatively adjusting said bars to vary the distance between the like notches of the adjacent bars.

11. A detecting bar for point detectors of the character described, having long and short notches in one of its outside edges located at different points lengthwise thereof and of a dimension transversely of said bar less than the width of the bar.

12. A detecting bar for point detectors of the charcter described having notches in one face at different points lengthwise thereof and disposed at different distances from the middle longitudinal line of said bar.

13. In a point detector, detecting bars adapted to be connected to switch points and arranged side by side to slide horizontally, said bars having notches in their edges, a circuit controller including a movable contact carrier mounted to rock on a horizontal axis, and rollers carried by said contact carrier and cooperating with said notches to permit rocking of the contact carrier in one direction or the other when all of the detecting bars are in the corresponding position.

14. In a point detector for switch operating mechanisms having a horizontally movable locking plunger, detecting bars adapted to be connected to switch points and arranged to slide horizontally substantially at right angles to the locking plunger, a circuit controller including a movable element mounted to rock on a horizontal axis, means for causing said element to assume one extreme position or the other only if all of the detecting bars are collectively in a position corresponding to the respective extreme positions of said element, and means for operating said element to a neutral position independently of the detecting bars while the locking plunger is in its unlocked position.

15. In a point detector for switch operating mechanisms having a locking plunger, independently movable detecting bars adapted to be connected to switch points, circuit controlling means including an element movable to either of two extreme positions and a neutral position, means including rollers whereby the respective extreme positions of said element are selected by said detecting bars acting collectively, and means for forcing said element to the neutral position independently of the detecting bars while the locking plunger is in its unlocked position.

16. A point detector of the type described comprising a plurality of detecting bars having notches in their edges, a rocking circuit controlling element movable bodily toward the bars, and means carried by said element on opposite sides of its axis adapted to enter said notches.

17. A point detector of the type described comprising a detecting bar having normal and reverse notches therein, a rocking circuit controlling element biased bodily toward said bar, and rollers carried by said element on opposite sides of its axis and adapted to enter said notches.

18. A point detector of the type described comprising a detecting bar having normal and reverse notches therein, a rocking circuit controlling element biased to move bodily toward said bar, said element carrying rollers on opposite sides of its axis adapted to enter said notches, and means for limiting the movement of said rollers away from the detecting bar, whereby said element is forced to a neutral position with the detecting bar in the intermediate position.

19. In a switch operating mechanism including a locking plunger, circuit controlling means actuated in accordance with the position of the switch points and the locking plunger, comprising detecting bars adapted to be connected to the switch points and having normal and reverse notches therein, and a movable element carrying normal and reverse rollers cooperating selectively with said notches.

20. A point detector comprising detecting bars, a single contact carrier, and means including a spring for operating said contact carrier to either of two extreme positions in accordance with the position of the detecting bars acting collectively, said means acting to force the contact carrier positively to a neutral position when the detecting bars are removed.

21. A point detector comprising a plurality of detecting bars arranged side by side to slide in opposite directions and having notches in their edges, a circuit controlling element having normal and reverse sets of rollers cooperating with said notches, the rollers of each set being in axial alignment and the rollers of each set which cooperate with oppositely moving bars being rotatable independently, thereby affording rolling contact with the detecting bars.

22. In a point detector for switch machines having a locking plunger, the combination with the frame of the switch machine, of a plurality of independently slidable detecting bars guided by said frame and adapted to be connected to switch points, and circuit controlling means including a single movable contact carrier adapted to assume any one of three different circuit controlling positions and controlled jointly by the locking plunger and said detecting bars, said detecting bars and locking plunger being movable into and out of the frame without requiring disconnection of the circuit controlling means.

23. In a point detector of the character described, the combination with a supporting frame, a plurality of detecting bars arranged side by side and guided by said frame, a circuit controller comprising contact fingers and a movable contact carrier, said bars being capable of insertion or withdrawal from the frame without disconnection of the circuit controller, and means for operating said contact carrier from its neutral position to either of two extreme positions to conform with the position of the detecting bars acting collectively, said carrier being positively forced to its neutral position when said bars are withdrawn.

24. In a switch operating mechanism of the type which includes a lock rod, a locking plunger having a lock dog engaging notches in said lock rod, a point detector comprising a single circuit controlling element adapted to assume a neutral position and either of two extreme positions, said element being actuated to its neutral position by the movement of the lock dog to its unlocked position.

25. A point detector comprising a plurality of detecting bars each having normal and reverse notches in one edge, and circuit controlling means including normal and reverse sets of rollers cooperating with said notches, each set of rollers being on a common axis.

26. A detecting bar for point detectors substantially rectangular in cross section and having a notch with rounded ends cut in one face, said notch being narrower than the width of said face.

27. A point detector comprising a detecting bar having normal and reverse notches in one edge, and circuit controlling means including normal and reverse rollers cooperating with said notches, said notches and rollers being capable of selective operation only.

28. A point detector of the type described comprising a plurality of detecting bars adapted to be adjustably connected to switch points and each having a long and a short notch in one edge, and circuit controlling means cooperating with said notches, said bars being arranged with their short notch in cooperative position with the circuit controlling means when the corresponding switch point is closed.

29. A point detector of the type described comprising, in combination with a supporting frame, circuit controlling means, a plurality of detecting bars guided in the frame and adapted to be connected to switch points, said bars having normal and reverse notches therein for controlling the movement of said circuit controlling means, said bars being capable of insertion or withdrawal from the frame without disconnection of the circuit controlling means, said notches being arranged to permit the bars to be inserted as a unit from either side of the frame, whereby the same bars and notches may be used for connection to switches located on either side of the frame.

30. A point detector for connection to switch points movable in opposite direction, comprising detecting bars having normal and reverse notches therein, and circuit controlling means having normal and reverse sets of rollers cooperating selectively with said notches.

31. In a point detector of the type described, a pair of detecting bars adapted to be connected as a unit to a switch point, said detecting bars having short and long notches in their faces disposed opposite each other, and means for adjusting said bars to change the distance between the short notches of the respective bars.

32. In a point detector of the type described, a plurality of detecting bars each having a normal and a reverse notch therein, a supporting member movable toward and away from said bars, a spring forcing the supporting member toward the bars, a single contact carrier mounted for oscillation on said supporting member, and normal and reverse sets of rollers on the contact carrier disposed on opposite sides of its axis and adapted to cooperate selectively with the notches in said bars, whereby the contact carrier is moved to one extreme position or the other by the action of said spring if the corresponding notches of all of the bars are positioned opposite the rollers on one side of the axis of oscillation of the carrier, and said carrier is positively forced to its neutral position by displacement of any one of the bars from such position.

33. In a point detector of the type described, a locking plunger, a plurality of detecting bars arranged side by side and adapted to be connected separately to switch points, a supporting member movable toward and away from the bars, a spring constantly tending to move said member toward the bars, a movable circuit controlling element mounted for oscillation on said supporting member, means on opposite sides of the axis of oscillation of the circuit controlling element cooperating with means associated with the detecting bars for permitting said element to be moved by the action of the spring from a neutral position to either extreme position provided all of the bars are in a corresponding position, and means operated by the locking plunger for independently forcing the circuit controlling element to its neutral position whenever said plunger is in its unlocked position.

34. In a point detector of the type described, the combination with a plurality of detecting bars separately connected to switch points and a locking plunger, said bars and plunger moving horizontally in intersecting planes, of a single oscillatory contact carrier movably supported to move bodily toward and away from the bars, means associated with said contact carrier and each of the detecting bars for causing the carrier to assume an extreme position provided all of the detecting bars are in a corresponding position, and means operated by the locking plunger for forcing the contact carrier to a neutral position independently of the presence or position of said detecting bars.

35. In a point detector, a plurality of separately movable detecting bars arranged close together side by side and each having normal and reverse notches in one face, a rocking contact carrier extending transversely of the bars along the faces having the notches therein, resilient means constantly urging said carrier toward said bars, and normal and reverse sets of rollers on the carrier on opposite sides of its axis of oscillation for cooperating with the notches in the bars to cause the carrier to assume either extreme position provided all of the bars are in a corresponding position, and to positively force the carrier to a neutral position upon displacement of any one of the bars from such position.

36. A circuit controlling device for detecting the position and locked condition of switch comprising, a plurality of independently movable detecting bars separately connected to the switch points, a locking plunger, said plunger and bars being supported for movement horizontally substantially at right angles to each other, a single contact carrier disposed above the point of intersection of said plunger and detecting bars, said carrier being supported for oscillation and also for bodily movement toward and away from the detecting bars, means including a spring and cooperating projecttions and recesses for permitting said carrier to assume either extreme position whenever all of the detecting bars are in a corresponding extreme position, and for positively forcing said carrier to a neutral position whenever any one of said bars is displaced from an extreme position, and means associated with the locking plunger and contact carrier for positively forcing the carrier to its neutral position whenever the plunger is unlocked and independently of the position of the detecting bars.

37. A circuit controlling device of the character described comprising, in combination with a locking plunger and a detecting bar, a single rocking contact carrier, rollers on said carrier on opposite sides of its axis of oscillation, said detecting bar having normal and reverse notches cooperating with said rollers, and means associated with a locking plunger and said carrier and constituting cooperating cam surfaces for positively forcing the carrier to a neutral position independently of the detecting bar whenever the locking plunger is shifted to its unlocked position.

RICHARD C. LEAKE.